United States Patent [19]

Waterman et al.

[11] 3,859,692

[45] Jan. 14, 1975

[54] RESTRAINT FOR FLEXIBLE CONDUITS

[76] Inventors: Sherwood V. Waterman, 9 Lakewood Heights Dr., Lakewood, Colo. 80215; Roy F. Humble, 8365 Zepkyr St., Arvada, Colo. 80005

[22] Filed: June 12, 1973

[21] Appl. No.: 369,374

[52] U.S. Cl. ................................. 24/73 R, 285/117
[51] Int. Cl. ..................... A44b 21/00, F16l 35/00
[58] Field of Search .............. 285/82, 117, 81, 114; 24/73 R, 81 R, 81 PE

[56] References Cited
UNITED STATES PATENTS

| | | | |
|---|---|---|---|
| 927,635 | 7/1909 | Calvert | 285/114 |
| 2,461,427 | 2/1949 | Kneebone | 285/114 X |
| 2,746,773 | 5/1956 | Bily | 285/117 |
| 3,186,611 | 6/1965 | Sonderman | 24/73 R X |
| 3,249,370 | 5/1966 | Brogden | 285/81 |
| 3,258,230 | 6/1966 | Bollinger et al | 24/73 R X |
| 3,469,287 | 9/1969 | Hamline | 24/73 R |

*Primary Examiner*—Donald A. Griffin
*Attorney, Agent, or Firm*—C. B. Messenger

[57] ABSTRACT

A safety device to restrain the whipping of hoses that are detached while under pressure. A cable halter is formed to provide loops that are engageable about the hoses with a spring biased slide element urging the loop towards tight engagement with the hose structure. Oval sleeves or bushings are used in alternate open and compressed states to provide the slide elements and the cable splices and/or a permanent cable anchoring capability.

4 Claims, 4 Drawing Figures

PATENTED JAN 14 1975 3,859,692

RESTRAINT FOR FLEXIBLE CONDUITS

BACKGROUND OF THE INVENTION

Where compressed air or other fluid under pressure is delivered through flexible or other conduits and where quick disconnect connectors are used on such conduits, the connections or the conduits themselves can become dislodged. The resulting quick release of fluid pressure is often accompanied by the flying or whipping of the conduit. A whipping air hose or other fluid carrier can be dangerous. In order to provide the safer working conditions now required, some type of auxiliary restraint is required that will eliminate such dangerous conditions.

SUMMARY OF THE INVENTION

The present invention provides a safety halter that may be applied to air hoses and other flow conduits that are subjected to increased pressure influences. The halter comprises a cable structure having looped ends that may be engaged about elements of the flow conduits. Spring or other elastic members are retractable at the time of installation so the loop may be increased in size with such elastic elements being operable to reduce the size of the loop for closely engaging the flow conduit when the halter is installed. The halter or restraint will usually be applied to hoses or other flow conduits adjacent quick disconnect type connectors so that inadvertent release of the connectors will not result in unsafe whipping of elements of the flow conduit. Oval sleeves or bushings are used adjacent the loops to provide a slide element for control of the loop size, while similar sleeves and bushings are used in compressed or swagged condition to secure the cable ends or to hold a loop in tightly secured engagement with an anchor element.

DESCRIPTION OF THE PREFERRED EMBODIMENTS

Figure 1:
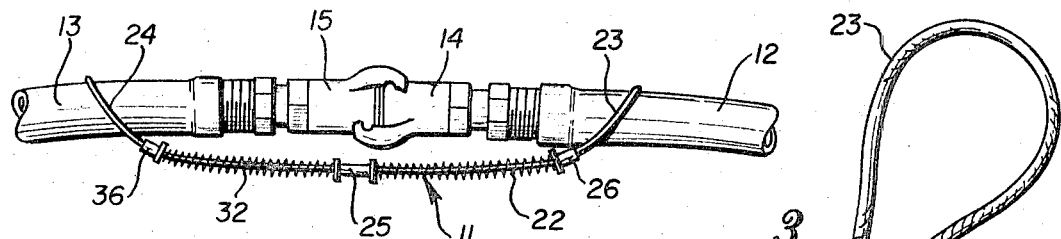
FIG. 1 is a side elevation showing coupled hoses.
Figure 2:
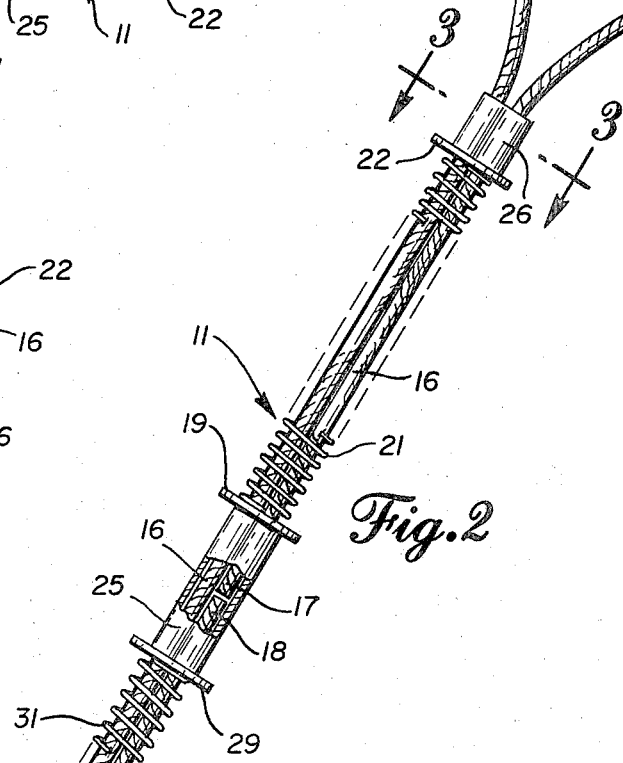
FIG. 2 is an enlarged side elevation in partial section showing the present device.

FIGS. 1 and 2 show features and elements of a preferred embodiment of the invention. As shown in FIG. 1, the halter 11 is engaged between a supply hose 12 and a delivery hose 13, and it extends past the elements 14 and 15 of a quick disconnect coupler system. A cable 16 extends from a central position to otherwise free ends 17 and 18 which are received and securely held in a crimped bushing or oval sleeve 25. Before being secured by the central bushing 25 the cable extends from the central position outwardly through a washer 19, a compression spring 21, an outer moving washer 22 and a sliding bushing 26. After forming a loop, such as the loop 23, the free end 17 passes back through the sliding bushing 26, washer 22, spring 21, washer 19, and it is received and held in the bushing 25. Similar structure is provided at the opposite end with the washers being identified by the numbers 29–32, the compression spring is 31 and a slide bushing is 36. With this construction inwardly directed reciprocal movement of the washer 22 and bushing 26 will compress the spring 21, and the loop 23 will, accordingly, be increased in size so that it could be engaged over the body of the hose 12. Before the coupling 14–15 is engaged the other end loop 24 will be expanded for engagement over the delivery hose 13. Release of the slide bushings 26 and 36 will allow the springs 21 and 31 to extend thereby reducing the size of the loops 23 and 24 so that such loops will then closely engage the hoses 12 and 13, respectively. The safety halter or hose restraint 11 will stay in such engaged position, while the coupler 14–15 is engaged and will remain in engagement if such coupler comes loose. With the hoses 12 and 13 joined together by the halter 11, whipping movements of the hose ends will be avoided if the coupler is inadvertently loosened or if the coupler is mistakenly detached while the hoses are still under pressure.

Figure 3:
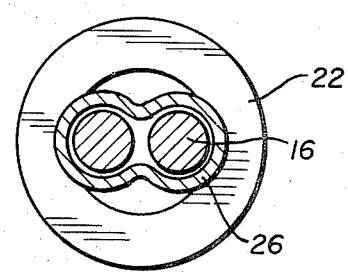
FIG. 3 is a cross-sectional elevation taken along the line 3—3 of FIG. 2, and, FIG. 4 is a side elevation showing additional use of the device.
Figure 4:
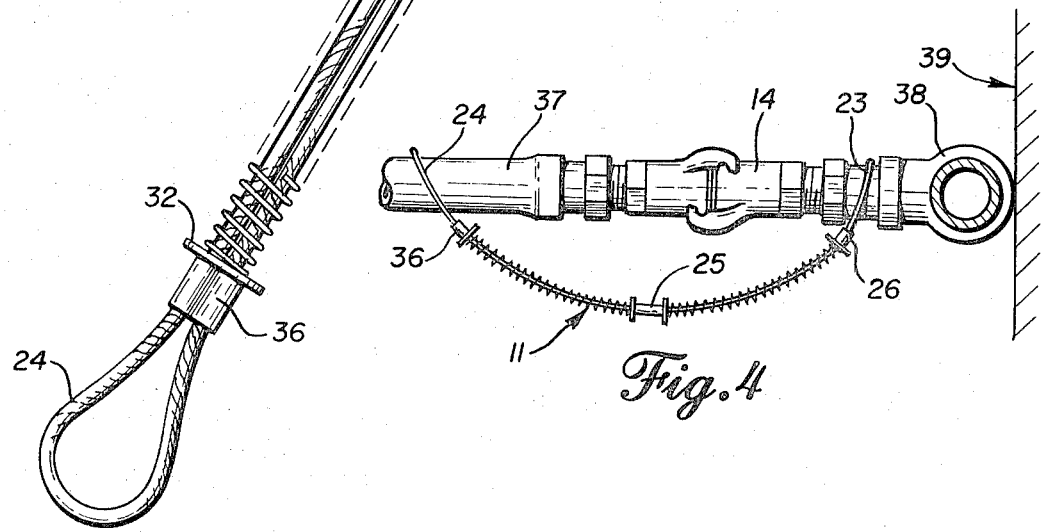

A cross-section for the slide bushing 26 is shown in FIG. 3. As shown in this illustration, the cable 16 is loosely engaged within the bushing 26, and, accordingly, the bushing may be moved reciprocally with respect to the cable. To provide this sliding bushing a "Nicopress" oval sleeve is used. An identical structure is used for the central bushing 25, but at this point the bushing has been crimped through use of a compression tool that is regularly provided by the National Telephone Supply Co. of Cleveland, Ohio, for use with their "Nicopress" sleeves. When crimped, bushings of the type shown will closely and securely engage the outer surfaces of the cable, and thereafter no sliding movement is possible. Cable splices, eye splices and slings are regularly made through use of bushings of this type when compressed. The use of a bushing at the loop ends, which is not regularly compressed when the halters are to be used for non-permanent joining of hose components, has a further advantage when the halters 11 are to be used on permanent installations.

Where a flexible hose, such as the hose 37 of FIG. 4, is to be interconnected to a permanently installed piping system 38 that may be attached to the walls 39 of a factory or to the sidewalls of a mine tunnel, one loop 23 of the halter 11 can be engaged over an element of the piping system 38, as behind the coupler 14, and the bushing 26 can then be crimped to permanently hold the halter 11 in this installed position. With the slide bushing 26 crimped in place the loop 23 will be of a permanent small size to closely engage the piping system, and it cannot thereafter be removed unless the coupler 14 is removed. With the halter 11 thus permanently installed its free end will always be at a position for engagement with the hose 37 or with any other hose that might be placed at the outlet provided by the coupler 14. Since the restraining halters 11 are provided to improve safety aspects in working areas, this multi-use bushing feature provides for permanent attachments as well as for temporary installations. Halters of the described type can be used to maintain the safe working conditions now required under the newly enacted Occupational Safety and Health Act where either permanent or temporary facilities are provided. Where the overall length of the halter and the strength of the cable is adequate, one halter configuration and size can be used to provide the desired safety features even though the size of the flow conduit or hose is varied over a wide range. With the present construction the size of the loops 23 and 24 can be varied at will to accommodate a single halter to such various job site requirements.

The restraining halter provided is especially beneficial, inasmuch as the loops may be closely engaged about the hose structure itself at positions away from the connectors themselves. Under conditions of rugged usage or where the connectors have not been properly installed or maintained, it has been noted that the hose often breaks adjacent the connector or the connector is separated from the hose. Since the present device can be attached to the conduits or hoses themselves, the safety benefits provided are not dependent upon the maintenance of a secure hose-to-connector junction.

The basic construction shown and described can also be used in other ways to restrain hoses or other fluid conduits. If the spring, washer and slide bushing 26 are removed from one end of the halter 11, an enlarged anchoring loop will be provided. For instance, if the washers 19–22, the spring 21 and the slide bushing 26 are removed from the assembly, the loop 23 will then be of an enlarged size. Such an enlarged loop may be used to secure this one end of the halter 11 to a flow conduit or other structure to provide the desired anchor. If the halter is to be joined to a pipe, the loop 23 is laid alongside the pipe, and the remainder of the halter structure is doubled back through the loop from the other side of the pipe. The resulting knot can be pulled tight to hold the halter in anchored position.

For all units in which the springs and bushings are used, an additional advantage is noted. The springs, bushings, washers, etc. surround the cable and serve as protection therefor to prevent abrasion and snagging of the cable structure. Since the spring elements are of hardened wire providing a still flexible structure, the spring can protect the cable without being damaged itself as the halter and the hoses to which the attachment is applied are dragged through and across abraiding materials and rough surfaces.

We claim:

1. A safety restraint attachment for use on separable flow conduits that are subjected to differential pressure influences comprising a centrally disposed body section, a strand of material doubled on itself and extending outwardly from said body to provide a loop component for engagement about said flow conduit at a position on one side of an expected place of separation of said conduit, an anchor component on said attachment for engagement to said flow conduit at a position on another side of said expected place of separation, a slide bushing at said loop component and disposed about both legs thereof for reciprocal movement therealong to adjust the size of the provided loop, and resilient means acting on said slide bushing and biased to reduce the size of said loop whereby the loop component may be secured to flow conduits of varied size, said central body being a crimped bushing for securely holding the free ends of said strand material.

2. The attachment as set forth in claim 1 where said strand of material extends outwardly from said crimped body in separate directions to provide a plurality of loop components with one of said loops providing the anchor component for said attachment.

3. The attachment as set forth in claim 1 wherein said resilient means is a coil spring positioned to surround a portion of said strand material for the protection thereof, and the said slide bushings are of oval shape for engagement about the separate legs of said strand material to limit the size of the loop thereof.

4. The attachment as set forth in claim 3 wherein said strand material is formed into separate loop components extending in opposite directions from the central body with the free ends of said strand material disposed within said central body and wherein said central body and slide bushings are all of an oval type with said central body being crimped to hold the strand material in the double looped configuration.

* * * * *